United States Patent Office 3,466,187
Patented Sept. 9, 1969

3,466,187
PRESSURE-SENSITIVE TAPE
Frederick E. Heinemann, Canton, and Charles B. Moore, Scituate, Mass., assignors to W. R. Grace & Co., Cambridge, Mass., a corporation of Connecticut
No Drawing. Continuation-in-part of application Ser. No. 465,738, June 21, 1965. This application May 6, 1968, Ser. No. 727,048
Int. Cl. C09j 7/00
U.S. Cl. 117—122                                   4 Claims

ABSTRACT OF THE DISCLOSURE

A cellulosic sheet containing between 5 and 20% asbestos fibers, based on the total weight of cellulose and asbestos, is impregnated with elastomeric composition (e.g. a carboxylic/butadiene/acrylonitrile copolymer latex) and coated at least on one side with a pressure sensitive adhesive. The product exhibits enhanced resistance to delamination and is ideally suited for use as a pressure sensitive adhesive tape.

---

This application is a continuation-in-part of application U.S. Ser. No. 465,738 filed June 21, 1965, and now abandoned.

This invention relates to novel impregnated paper and to processes for preparing same. More particularly, this invention relates to impregnated paper containing asbestos fibers.

Paper impregnated with polymeric materials enjoy a wide variety of uses. For example, such impregnated papers may be coated with a variety of materials to provide decorative surfaces, or they may be coated with adhesive compositions or abrasive compositions to provide pressure-sensitive tapes or sandpaper. Such impregnated paper sheets have achieved considerable importance as tape backings in the preparation of pressure-sensitive tape materials.

Such impregnated papers have been deficient in certain properties such as tensile strength, stiffness, and delamination resistance. While some of these properties can be improved by the use of certain polymeric saturants and by using various levels of the saturants, the advantageous effects which accrue to one or more of the properties is generally at the expense of the other properties. For example, increased delamination resistance may be achieved by increasing the level of saturant. However, increasing levels of polymeric impregnant result in markedly increased costs and also a point is reached where the polymeric materials merely coat the sheet instead of penetrating the sheet.

It has now been found that by utilizing a sheet of cellulosic paper which contains a relatively small amount of asbestos fiber, certain properties of the paper after impregnation are greatly enhanced without adversely affecting other properties of the paper. The present invention contemplates the use of between 5 and 20% by weight of asbestos based on the total weight of the cellulose and asbestos. Preferably, 10% asbestos is employed. The use of the above levels of asbestos markedly increase delamination resistance without reducing tensile strength, elongation, and tear of the saturated paper. There are also processing advantages achieved in preparing the paper sheets from a fiber slurry which contains asbestos. Fuzziness of the unimpregnated paper is virtually eliminated by the presence of the asbestos in the pulp, and sheet formation is improved.

The papers of this invention containing asbestos fiber are predimantly cellulosic, that is, contain at least a major amount of cellulosic fibers and are prepared by methods known to the art. The asbestos is added to the fiber slurry prior to the sheet formation, and the sheet is then formed into paper of the desired weight by conventional methods.

Saturating compositions known to the art are employed in preparing the novel impregnated papers of the persent invention. Preferably, elastomeric materials such as butadiene/acrylonitrile copolymer latices, butadiene/styrene copolymer latices, neoprene, and carboxylic butadiene copolymer latices are employed. In addition to the elastomeric materials, the saturating compositions may also employ other additives such as antioxidants, chelating agents, and wet strength resins such as phenol formaldehyde, melamine formaldehyde, and urea formaldehyde.

A wide range of saturation levels are employed depending upon the product being prepared. Generally, about 20 to 100, preferably about 40 to 75, parts by weight of the elastomeric saturant per 100 parts by weight of cellulose and asbestos in the cellulosic sheet are employed in the product of the invention.

Conventional methods of impregnation are employed in preparing the novel papers of the present invention, however, impregnation of the papers is preferably carried out on the dry paper, that is, on paper formed on the paper-making machine and then dried prior to impregnation.

Pressure sensitive adhesives are well known in the art, any of which are suitable for use on the impregnated papers of the invention so long as they do not deleteriously affect the impregnated cellulose-asbestos sheet. Most of the commonly used pressure sensitive adhesives are based on relatively non-polar elastomers such as natural rubber, polyisoprene and vulcanizable elastomeric copolymers and interpolymers of at least 40 percent butadiene and at least 10 percent styrene. Typical are the normally tacky and pressure sensitive types disclosed in, for example, U.S. Patents 2,415,901, 2,405,926 and 2,397,774.

It has now been found that the greater amount of asbestos in the impregnated paper (between 5 and 20%), the higher the delamination resistance of the paper regardless of the level of saturation. As stated above, while delamination resistance of the impregnated paper is higher in paper containing asbestos, there is no deleterious effect noted on the other properties of the saturated sheets. Paper containing levels of asbestos in excess of 20% are found to be particularly difficult to impregnate. At least 5% must be employed in the paper in order to achieve the aforementioned beneficial effects.

The asbestos employed is preferably short fibered, i.e., less than ¾ inch in length. In a preferred embodiment chrysolite asbestos, shorts and floats are employed, e.g., Johns-Manville Paperbestos No. 5. In a particularly preferred embodiment at least 80% of the asbestos passes through a 100 mesh screen.

In addition to the aforementioned advantageous results, paper particularly useful for use as masking tape can be prepared from asbestos-containing paper within the scope of the present invention without the necessity of creping, which is normally used in the preparation of masking tape bases. Prior to the present invention paper suitable for use in the preparation of masking tape was made from pulp which has been mechanically refined in a heater or jordan so that it will have sufficiently high delamination resistance after saturation. However, the beating necessary to provide high delamination resistance results in a sheet that is difficult to saturate and which has a relatively low stretch after saturation with polymeric impregnants. The difficulties in saturation and the low stretch induced by the beating is overcome by creping the sheet on the paper machine prior to drying. However, paper which has been creped is less desirable for use as a masking tape base and has certain inherent deficiencies which are not present in tapes prepared from smooth-surfaced bases. For example, it is difficult to obtain a straight edge using masking tape prepared from a creped base. This is particularly important in painting applications where the masking tape is used to shield one portion of painted area from another and a sharp, straight distinction is desired between the areas. Creped masking tape is also irritating to the hands where it is handled and applied for relatively long periods.

By means of the present invention papers of sufficient delamination resistance can be prepared without the necessity of a high degree of mechanical refining prior to the formation of the sheet. Thus the required tensile strength and stretch can be obtained by utilizing as the cellulosic components of the papers pulps which are naturally high in these properties. The presence of asbestos fiber in the paper of the present invention also slows the drainage rate of the pulp so that the unbeaten fibers can be readily formed into a satisfactory sheet.

It should be understood that while papers within the scope of the present invention are preferably prepared for use as masking tape bases without creping, creping is also employed if desired. Creped asbestos-containing papers within the scope of the present invention can be utilized to prepare masking tapes having good strength properties at relatively low levels of polymeric impregnation.

The following nonlimiting examples illustrate the preparation of the novel papers of the present invention. The asbestos employed was Johns-Manville Paperbestos No. 5 having the following size classifications:

| | Percent |
|---|---|
| On 4-mesh screen | 0.6 |
| On 14-mesh screen | 0.8 |
| On 35-mesh screen | 5.4 |
| On 200-mesh screen | 29.1 |
| Through 200-mesh screen | 64.1 |

EXAMPLE 1

Two uncreped papers were made and saturated in the same manner except that sufficient asbestos fiber was added to the pulp of one to give a level of 15% by weight of asbestos in the sheet based on the total of cellulose and asbestos. The saturation level was 40 parts by weight of medium nitrile latex (Hycar 1562) per 100 parts by weight of paper. The cellulosic component in each paper was northern kraft with a small amount of chemically-curled fibers. The following comparison of the properties illustrates the advantages of the paper of the present invention.

| | Control paper | Paper with 15% asbestos |
|---|---|---|
| Ream weight | 198 | 198 |
| Caliper, in | 0.047 | 0.040 |
| Density | 4.22 | 4.95 |
| Tensile, lbs./in. width raw paper: | | |
| MD | 15.5 | 5.7 |
| CD | 5.9 | 4.3 |
| Tensile, lbs./in. width saturated paper: | | |
| MD | 39 | 37 |
| CD | 19 | 28 |
| Edge tear, lbs.: | | |
| MD | 23 | 24 |
| CD | 28 | 26 |
| Brass block internal strength | 26 | 41 |
| Delamination resistance | 13.6 | 22.4 |
| Elmendorf tear, grams: | | |
| MD | 668 | 650 |
| CD | 998 | 698 |

It will be noted that the MD tensile strength of the raw paper which contains asbestos is approximately ⅓ that of the all-cellulosic paper. However, upon saturation, the tensile strengths are approximately equal. In addition, the use of asbestos provides a "squarer sheet," that is, there is less a variation in the properties from the machine direction to the cross-direction in the paper of this invention as compared with the control paper. The paper containing the asbestos has 57% greater internal strength and 64% more delamination resistance than the control paper.

EXAMPLE 2

Papers suitable for use as synthetic leather bases were prepared. A 100% cellulosic sheet was prepared of northern kraft fibers with a small amount of chemically-curled fibers. Using the same cellulosic fibers, papers were prepared from furnishes which also contained various amounts of asbestos fibers. The papers were saturated with a 54/46 butadiene/styrene latex to a level of 40 parts of saturant per 100 parts of paper, dry basis. The papers were not creped. Below is a comparison of the above papers.

| | Control | Sample A | Sample B |
|---|---|---|---|
| Percent asbestos | 0 | 5 | 10 |
| Ream weight | 90 | 101 | 87.5 |
| Caliper, in | 0.010 | 0.011 | 0.010 |
| Tensile, lbs./in. width: | | | |
| MD | 24 | 30 | 31 |
| CD | 12 | 15 | 14 |
| Delamination resistance, oz | 7 | 11 | 11 |

In the above papers containing asbestos, an increase in delamination resistance of over 50% is noted.

EXAMPLE 3

A paper containing 10% by weight of asbestos fibers, 80% northern kraft, and 10% chemically-curled northern kraft and having a ream weight of 27 lbs. was prepared on a Rotoformer machine. The dry paper was saturated with medium nitrile latex (Hycar 1562) to a level of 75 parts by weight of polymer on 100 parts by weight of paper. In evaluating the product, a comparison was made with a commercial cellulosic crepe base having a 28-lb. ream weight which was saturated to the same level with the same polymer.

| | Cellulosic creped paper | Example 3 |
|---|---|---|
| Tensile, MD, lbs./in. width | 21.7 | 19.8 |
| Elongation, percent | 16.0 | 17.3 |
| Caliper, in | 0.0074 | 0.0051 |
| Elemendorf, grams | 84 | 128 |
| Delamination resistance, oz | 56 | 56.5 |

The above data shows that the novel product of the present invention is equal and in many cases better than creped commercial paper which is currently widely used in preparing tape backings.

The above product prepared in Example 3 was then fabricated into a pressure-sensitive tape by applying a layer of pressure-sensitive adhesive to one side of the paper. Superior results were found with the tape prepared by means of the present invention than with prior art tapes.

In order to evaluate impregnated asbestos-containing paper, a paper was prepared from a basic furnish of 2 parts chemically curled northern kraft and 1 part western softwood sulfite pulp to which was added varying amounts of asbestos fiber. The thus-formed series of papers were impregnated with several levels of Hycar 1562 latex. The impregnated paper was dried and then subjected to a series of tests to evaluate the effect of the asbestos in the impregnated paper.

It was found that increasing amounts of asbestos in the papers provide delamination resistance and tensile strength at lower levels of impregnation than have been possible prior to the present invention.

Below are the procedures employed in determining the properties of the papers in the foregoing examples.

The Elmendorf Tear resistance (internal tearing resistance of the paper) is determined by TAPPI Standard Method T414m–49.

Tensile strength is determined by TAPPI T404m–50.
Elongation is determined by TAPPI T457–46.
Delamination resistance is the force expressed in ounces per inch of width, required to continue the splitting of the paper in the machine direction into approximately two equal plies. Two strips of rug binding tape 9 inches in length are placed on 10-inch x 1-inch specimen of paper so that approximately 0.5 inch of paper extends beyond each end of the tape. The specimens are pressed for 30 seconds at 275° F. and 5 p.s.i. with about 0.5 inch of tape extending beyond the edge of the press. The two free ends of the tape are pulled until the specimen starts to separate into two equal plies. The two free ends of the tape are then placed in the jaws of an Instrom Tester, and the machine is run at 10 inches/minute.

In addition to the desirable employment of the novel papers of the present invention as pressure-sensitive tape base and protective paper, the papers are also useful as automatic door panel coverings and synthetic leather uses.

It is understood that suitable changes, modifications, and variations may be made without departing from the spirit and scope of the invention.

What is claimed is:

1. A cellulosic product particularly adapted for use as a pressure-sensitive adhesive tape comprising a backing and a pressure sensitive adhesive coating on at least one surface thereof, said backing consisting essentially of a cellulosic sheet containing between 5 to 20% asbestos fibers based on the weight of the cellulose and asbestos, said sheet being impregnated with from about 20 to 100 parts by weight of an elastomeric composition per 100 parts by weight of cellulose and asbestos in said sheet.

2. A product as defined in claim 1 wherein the cellulosic fibers are curled.

3. A product as defined in claim 1 wherein said sheet is impregnated with a carboxylic butadiene/acrylonitrile copolymer latex.

4. A product as defined in claim 1 wherein said sheet is impregnated with from about 40 to 75 parts by weight of said elastomeric composition per 100 parts by weight of cellulose and asbestos in said sheet.

References Cited

UNITED STATES PATENTS

| | | | |
|---|---|---|---|
| 1,956,045 | 4/1934 | Richter | 92—3 |
| 3,055,496 | 9/1962 | Dunlap | 206—59 |

WILLIAM D. MARTIN, Primary Examiner

B. PIANALTO, Assistant Examiner

U.S. Cl. X.R.

117—126, 155